No. 862,430. PATENTED AUG. 6, 1907.
J. W. WINNINGHAM.
CUTTER HEAD.
APPLICATION FILED DEC. 13, 1906.
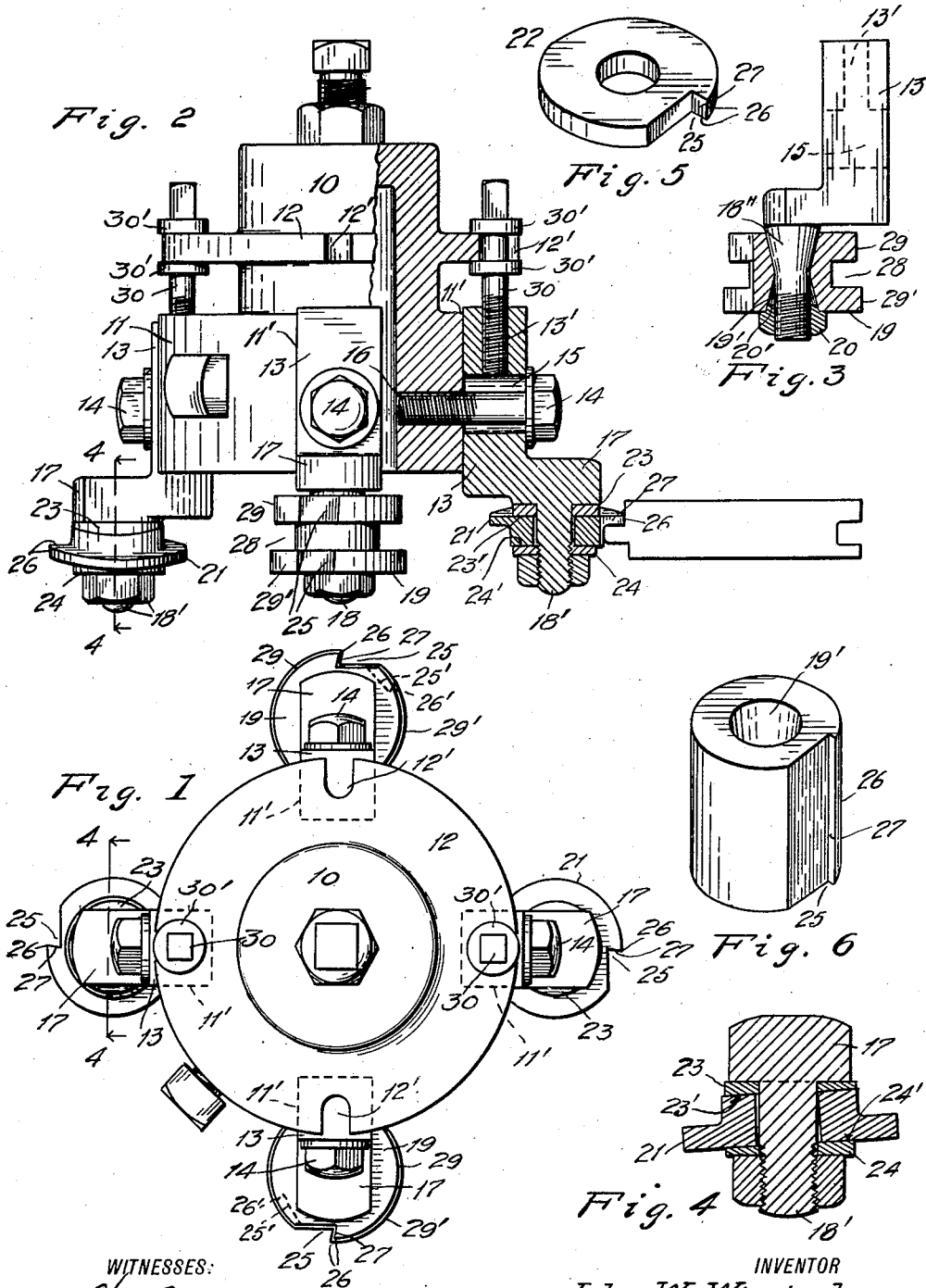
WITNESSES:
INVENTOR
John W. Winningham
BY
Pierre Barnes
ATTORNEY

UNITED STATES PATENT OFFICE.

JOHN W. WINNINGHAM, OF SEATTLE, WASHINGTON.

CUTTER-HEAD.

No. 862,430.      Specification of Letters Patent.      Patented Aug. 6, 1907.

Application filed December 13, 1906. Serial No. 347,600.

*To all whom it may concern:*

Be it known that I, JOHN W. WINNINGHAM, a citizen of the United States, residing at Seattle, in the county of King and State of Washington, have invented certain new and useful Improvements in Cutter-Heads, of which the following is a specification, reference being had therein to the accompanying drawings.

My present invention relates to improvements in cutter-heads for use upon arbors of wood-planers and carrying cutter-bits whereby the tongues or grooves of flooring, or other matched or molded mill stuff is formed.

The object is to simplify and perfect a device of this character so that it will be very effective and durable in operation, not easily deranged, and readily adjustable to vary the position of the cutter-bits, and likewise be capable of receiving different types of the latter, interchangeably, to accomplish a great variety of work.

The invention consists in the novel construction, arrangement and combination of parts as will be hereinafter described and claimed.

In the accompanying drawings, illustrating an embodiment of my invention, Figure 1 is a plan view; Fig. 2, a side view of same, partly in section; Fig. 3, a side view of one of the bit-carriers, with the bit thereon shown in section; Fig. 4, a sectional view taken through 4—4 of Figs. 1 and 2; and Figs. 5 and 6, perspective views of forms of cutter-bits not illustrated in the foregoing views.

The cutter-head consists of a hub 10 provided with annular flanges 11 and 12, respectively, at one end and intermediate the length of the hub. Flange 11 has in its periphery a plurality of longitudinally arranged recesses 11′ disposed in pairs, the complements of the pairs being diametrically opposite. Slidably seated within each of said recesses is the shank 13 of a bit-carrier which is movably and adjustably secured in its respective seat by a bolt 14 extending through an elongated aperture 15 of the shank and into a threaded hole 16 of the flange. Said carriers are each provided with a rectangular arm 17 provided with a pendent screw-threaded stud 18, or 18′, which is desirably made integral with the carrier arm. These studs would be made cylindrical where they are to carry relatively thin bits, but for bits of greater depths, such as jointer bits 19, they would each be formed of a conical shape, as at 18″, in proximity of its carrier arm, and thence extend in a cylindrical form to its outer end, which is screw-threaded. The aforesaid jointer bits are severally provided with a socket 19′ which tapers in both directions from the middle so that the bit may under certain conditions, an example of which will be presently noted, be placed from either end upon the stud and have one or the other of the tapered portions of its socket register with the conical portion of the stud. The flaring portion of a stud thus furnishes a seat for the bit which is held thereupon by a nut 20 desirably provided with a circular depression 20′ adapted to interfit with the enlarged end of the socket presented, as shown in Fig. 3.

The type of bits just considered are disposed upon the respective carriers to have their axes parallel with the axis of the head as have likewise the bits, like that shown in Fig. 6, which are employed in jointing the grooved side in matched work. The bits 21 or 22 which are used in shaping the tongues and grooves, respectively, of such work are, however, tiltably mounted upon the studs 18′ of their carriers to afford suitable clearance to the bits. This manner of mounting the bits is attained by means of two shim-washers 23 and 24 having at least one face in each, as 23′ and 24′, see Fig. 4, inclined from a plane at right angles to their axes, whereupon the amount of inclination to be given a bit is attained by turning the washers in one rotary direction or the other.

The cutter-bits, as illustrated in the drawings, are each of circular shape with a reëntrant angle 25, making with the respective periphery, cutting edges 26 and faces 27 serving as chip-breakers.

Bits 19 for jointing tongue-sides of matched work have circumferential recesses 28 to provide protruding portions 29 and 29′ to straddle the tongue and cut away the shoulders of the work which are contiguous with the tongue, and, that a tight joint may be had at the upper exposed surface when laid in a floor, the portion 29 of a bit is made slightly less in diameter than the other, 29′, thus causing the floor boards to be cut away to a greater amount at the bottom to prevent their contacting thereat. In certain kinds of matched work, for instance in stock for partitions, and wherein it is desirable that the stock be cut away equally both above and below the tongue for close fits upon both sides, one of the tongue jointer-bits would be reversely secured upon the seat when the stock would be obviously "jointed" by the bit parts of greatest diameter. When such reversal of a bit part is had, then the same would necessarily have to be provided with a reversely arranged cutting edge as indicated by broken lines 25′, in Fig. 1, to present cutting edges 26′ to be properly directed when the bit is turned over, end for end. Said intermediate flange, 12, is provided with peripheral slots 12′ which are disposed in the respective radial planes with the aforesaid recesses 11′ of the end flange. The function of the flange 12 is to carry adjustment screws 30 extending through the slots 12′ thereof into screw-threaded apertures 13′ of the bit-carrier shanks, whereby the carriers may be very nicely adjusted longitudinally of the head while the respective securing bolts 14 are temporarily withdrawn sufficiently to permit of the up or down movement of the carrier. To effect such movement the screws 30 are prevented from being moved in a longitudinal direction by suitable stops engaging with the flange 12, desirably by collars 30' arranged to have their opposing faces bear against this flange. In the drawings, I show said adjustment screws in connection only with the carriers for the cutter-bits, 21, employed in "sizing" the groove of the work, as in the example of work considered require only such sizing bits being accurately adjusted.

From the foregoing it will be seen that a cutter head constructed in accordance with my invention is capable of a wide range of planer work, as in all classes of jointing, matching, surfacing, and molding of lumber, and can be quickly changed from one to the other by substituting the proper cutters for those previously in use, and manipulating the adjustment devices to bring the tool into register.

The employment of adjustably movable washers is peculiarly advantageous as affording means to tilt the cutters for various amounts of clearance as demanded by a particular piece of work, or the condition of the wood, and likewise allows of their being removed and the cutters used perpendicular to the respective stud, to cut beads in moldings, for instance.

The advantages derived from the use of the adjustment screws are, that inasmuch as in setting the cutters to even a fair approximation to accuracy as heretofore it has been necessary to remove at least one of the heads in matched work of the "tongue and groove" type in order to tap upwardly with a hammer upon the carriers there employed when setting the cutter employed in sizing an underside face or in resetting the cutter to compensate for wear. Another noteworthy feature of the invention is in the use of the circular form of cutter-bits wherein the same radial section is carried about almost the entire peripheral surface, thus insuring the work attained through any of them being uniform and not appreciably influenced through the wear of the bit or in re-sharpening of the same.

Having described my invention, what I claim as new and desire to secure by Letters-Patent, is—

1. The combination with a cutter-head having a circular flange, and a bit-carrier adjustably secured thereto and provided with a depending conical shaped stud and a bit provided with a conical shaped socket adapted to be seated upon said stud.

2. The combination with a cutter-head having a circular flange, and a bit-carrier adjustably secured thereto and provided with a depending conical shaped stud and a bit provided with a conical shaped socket adapted to be reversibly seated upon said stud.

3. In a device of the class described, a head having a flange at one end provided with spaced peripheral guide ways extending longitudinally of the head and with an intermediate flange having spaced seats corresponding to said guide ways, cutter carriers having stocks slidably engaging said guide ways and provided with longitudinally transverse slots and with laterally extending arms, clamp screws engaging said head and operating through said slots to adjustably support said carriers in said guide ways, cutters adjustably connected to said arms, and adjusting screws rotatively disposed in said flange seats and operating in the stocks of said carrier.

4. In a device of the class described, a head having a flange provided with spaced peripheral guide ways, cutter carriers having stocks slidably engaging said guide ways and with laterally extending arms provided with threaded pins, said pins having one portion conical, cutter bits having central bores reversely conical at their ends and adapted to by reversely engaging with the conical portions of said pins, clamp nuts engaging said pins and operating to hold said cutters in position, and means for adjustably connecting the stocks of said carriers in said guide pins.

In testimony whereof I affix my signature in presence of two witnesses.

JOHN W. WINNINGHAM.

Witnesses:
PIERRE BARNES,
JOSEPH RISSE.